US012475331B2

(12) United States Patent
Zorn et al.

(10) Patent No.: US 12,475,331 B2
(45) Date of Patent: Nov. 18, 2025

(54) MODEL CAPABILITY EXTRACTION

(71) Applicant: Microsoft Technology Licensing, LLC, Redmond, WA (US)

(72) Inventors: Benjamin Goth Zorn, Woodinville, WA (US); Carina Suzana Negreanu, Cambridge (GB); Neil Blunt Toronto, Cambridge (GB); Brian Paul Slininger, Seattle, WA (US); Andrew Donald Gordon, Cambridge (GB); Advait Sarkar, Cambridge (GB); Elnaz Nouri, Seattle, WA (US); Vu Minh Le, Redmond, WA (US); Christian Leopold Bejamin Poelitz, London (GB); Shraddha Govind Barke, La Jolla, CA (US); Sruti Srinivasa Ragavan, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 17/969,922

(22) Filed: Oct. 20, 2022

(65) Prior Publication Data
US 2024/0135113 A1 Apr. 25, 2024
US 2024/0232545 A9 Jul. 11, 2024

(51) Int. Cl.
*G06F 40/51* (2020.01)
*G06F 40/35* (2020.01)

(52) U.S. Cl.
CPC .............. *G06F 40/51* (2020.01); *G06F 40/35* (2020.01)

(58) Field of Classification Search
CPC .......... G06F 40/51; G06F 40/35; G06F 40/30; G06N 3/08
See application file for complete search history.

(56) References Cited

U.S. PATENT DOCUMENTS

| 8,321,833 | B2 | 11/2012 | Langworthy |
| 10,474,961 | B2 | 11/2019 | Brigham et al. |
| 11,968,088 | B1 | 4/2024 | Yan |
| 2007/0169039 | A1 | 7/2007 | Lin |
| 2010/0269092 | A1 | 10/2010 | Dorman |
| 2014/0195466 | A1 | 7/2014 | Phillipps |
| 2015/0348541 | A1* | 12/2015 | Epstein ................. G10L 15/183 704/257 |
| 2016/0117364 | A1 | 4/2016 | Jahankhani |
| 2016/0299748 | A1* | 10/2016 | Scholz .................... G06F 8/427 |

(Continued)

OTHER PUBLICATIONS

Radziwill, Nicole M., and Morgan C. Benton. "Evaluating quality of chatbots and intelligent conversational agents." arXiv preprint arXiv:1704.04579 (2017). (Year: 2017).*

(Continued)

*Primary Examiner* — Fariba Sirjani
(74) *Attorney, Agent, or Firm* — Workman Nydegger

(57) ABSTRACT

The indirect querying of models to determine capabilities possessed by the model. Such indirect queries take the form of model input that potentially includes a natural language input user data. Such model input is structured such that the output of the model is either not natural language at all, or else is natural language that is not semantically responsive to the natural language input. Nevertheless, the output is evaluated to estimate or determine the capability possessed by the model. Thus, models may be more fully utilized to their better potential.

12 Claims, 6 Drawing Sheets

(56) References Cited

U.S. PATENT DOCUMENTS

| | | | |
|---|---|---|---|
| 2019/0156247 A1* | 5/2019 | Faulhaber, Jr. | G06N 3/045 |
| 2020/0137002 A1* | 4/2020 | Chavda | G06N 20/00 |
| 2020/0150937 A1 | 5/2020 | Smith | |
| 2020/0183963 A1* | 6/2020 | Ghaeini | G06F 16/3329 |
| 2021/0110895 A1* | 4/2021 | Shriberg | G16H 10/20 |
| 2021/0192397 A1* | 6/2021 | Rastogi | G06N 20/00 |
| 2021/0398524 A1 | 12/2021 | Gao | |
| 2022/0067292 A1* | 3/2022 | Rastogi | G06F 40/30 |
| 2022/0414347 A1* | 12/2022 | Levy | G06N 20/00 |
| 2023/0036072 A1* | 2/2023 | Gao | G06N 5/022 |
| 2023/0140125 A1* | 5/2023 | Glesinger | G06N 3/08 704/9 |
| 2023/0140553 A1* | 5/2023 | Mahindru | G06Q 10/06393 705/7.37 |
| 2023/0161945 A1 | 5/2023 | Vadapandeshwara | |
| 2023/0229864 A1* | 7/2023 | Kim | G06F 40/35 704/9 |
| 2023/0237277 A1* | 7/2023 | Reza | G06F 40/186 704/9 |
| 2023/0385180 A1* | 11/2023 | Yannam | G06F 11/3688 |
| 2023/0418815 A1 | 12/2023 | Zorn | |
| 2024/0127912 A1* | 4/2024 | Brown | G16H 10/60 |

OTHER PUBLICATIONS

Notice of Allowance mailed on Nov. 20, 2024, in U.S. Appl. No. 17/849,056 (Ms# 411616-US01), 11 pages.

"International Search Report and Written Opinion Issued in PCT Application No. PCT/US23/023348", Mailed Date: Aug. 23, 2023, 12 Pages. (Ms# 411616-WO-PCT).

Ragavan, et al., "GridBook: Natural Language Formulas for the Spreadsheet Grid", In Proceedings of the 27th ACM Symposium on Virtual Reality Software and Technology, Mar. 22, 2022, pp. 345-368.

International Search Report and Written Opinion received for PCT Application No. PCT/US2023/033331, Jan. 18, 2024, 14 pages.

Liguori, et al., "Can we generate shellcodes via natural language? An empirical study," Automated Software Engineering, Springer, US, Boston, vol. 29, No. 1, pp. 1-34, Mar. 5, 2022.

Bavishi, et al., "AutoPandas: neural-backed generators for program synthesis", Proceedings of the ACM on Programming Languages, vol. 3, Issue OOPSLA, Oct. 10, 2019, pp. 1-27.

Gulwani, et al., "NLyze: interactive programming by natural language for spreadsheet data analysis and manipulation", Proceedings of the 2014 ACM SIGMOD International Conference on Management of Data, Jun. 18, 2014, pp. 803-814.

Non-Final Office Action mailed on May 29, 2024, in U.S. Appl. No. 17/849,056 (MS# 411616-US01), 18 pages.

Ragavan, et al., "GridBook: Natural Language Formulas for the Spreadsheet Grid", Proceedings of the 27th International Conference on Intelligent User Interfaces, Mar. 22, 2022, pp. 345-368.

U.S. Appl. No. 17/849,056, filed Jun. 24, 2022.

International Preliminary Report on Patentability received for PCT Application No. PCT/US2023/033331, (MS# 411617-PCT01) May 1, 2025, 9 pages.

* cited by examiner

MODEL CAPABILITY EXTRACTION

BACKGROUND

Conventional large language models are deep neural networks that have on the order of billions (and fast approaching trillions) of parameters that may each be adjusted as the model is trained on textual training data. Such large language models are trained on large repositories of sequential text such as natural language text and/or imperative code. As an example, large language models can be trained on libraries of text collections, code files, or other sources of sequential text. Accordingly, such large language models can perform some tasks on a linear string of input text (also called a "prompt"). Large language models are sophisticated and can be very expensive to create. Thus, the large language models are often provided in the form of a cloud service. Examples of large language models include GPT-3®, AlphaCode, PaLM, DALL·E 2, and so forth.

As an example, some conventional large language models can receive natural language text and generate an appropriate response. Thus, large language models are used to allow artificial intelligence to have a conversation with a human. As another example, some conventional large language models can generate imperative code using a prompt in the form of a natural language description of what the imperative code should be able to do. As yet another example, some large language models can generate images that result from a natural language prompt.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Neural network models are capable of generating output from model input. As an example, language models are capable of generating output (such as output text, images, and so forth) based on a linear sequence of input text. This is particularly true of large language models, which typically comprise on the order of billions of parameters. Due to such complexity and extensive training of large models, it is often not completely clear what capabilities the model actually possesses. Furthermore, the inventors have discovered that directly querying (by issuing a natural language query and receiving a natural language response) a language model as to its capabilities is not the most effective mechanism to discover the capabilities possessed by the large language model.

By using the principles described herein, the capabilities of a complex model (such as a neural network with billions of parameters) may be identified through indirect interaction stages, such as. That is, in accordance with embodiments described herein, such indirect queries take the form of queries that are structured such that the output of the model is either not natural language at all, or else is natural language that is not semantically responsive to the natural language input, if any, represented in the query. Nevertheless, the output is evaluated to estimate or determine the capability possessed by the model.

As an example, the model input might be a request to perform a task, and the output is the task result (e.g., generated data, generated code, external references, images, other media, and so forth). The task results may then be evaluated to estimate or determine the capabilities that the model possesses. Thus, models may be more fully utilized to their better potential.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Neural network models are capable of generating output from model input. As an example, language models are capable of generating output (such as output text, images, and so forth) based on a linear sequence of input text. This is particularly true of large language models, which typically comprise on the order of billions of parameters. Due to such complexity and extensive training of large models, it is often not completely clear what capabilities the model actually possesses. For instance, the model may implicitly have certain information about the world that is implicit within the complex structures and weights of the model. Furthermore, the inventors have discovered that directly querying (by issuing a natural language query and receiving a natural language response) a language model as to its capabilities is not the most effective mechanism to discover the capabilities possessed by the large language model.

By using the principles described herein, the capabilities of a complex model (such as a neural network with billions of parameters) may be identified through indirect interaction stages. That is, in accordance with embodiments described herein, such indirect queries take the form of queries that are structured such that the output of the model is or should be either not natural language at all, or else natural language that is not semantically responsive to natural language input, if any, represented in the query. Nevertheless, the output is evaluated to estimate or determine the capability possessed by the model.

As an example, the model input might be a request to perform a task, and the output is the task result (e.g., generated data, generated code, external references, images, other media, and so forth). The task results may then be evaluated to estimate or determine the capabilities that the model possesses. Thus, models may be more fully utilized to their better potential.

Figure 1:
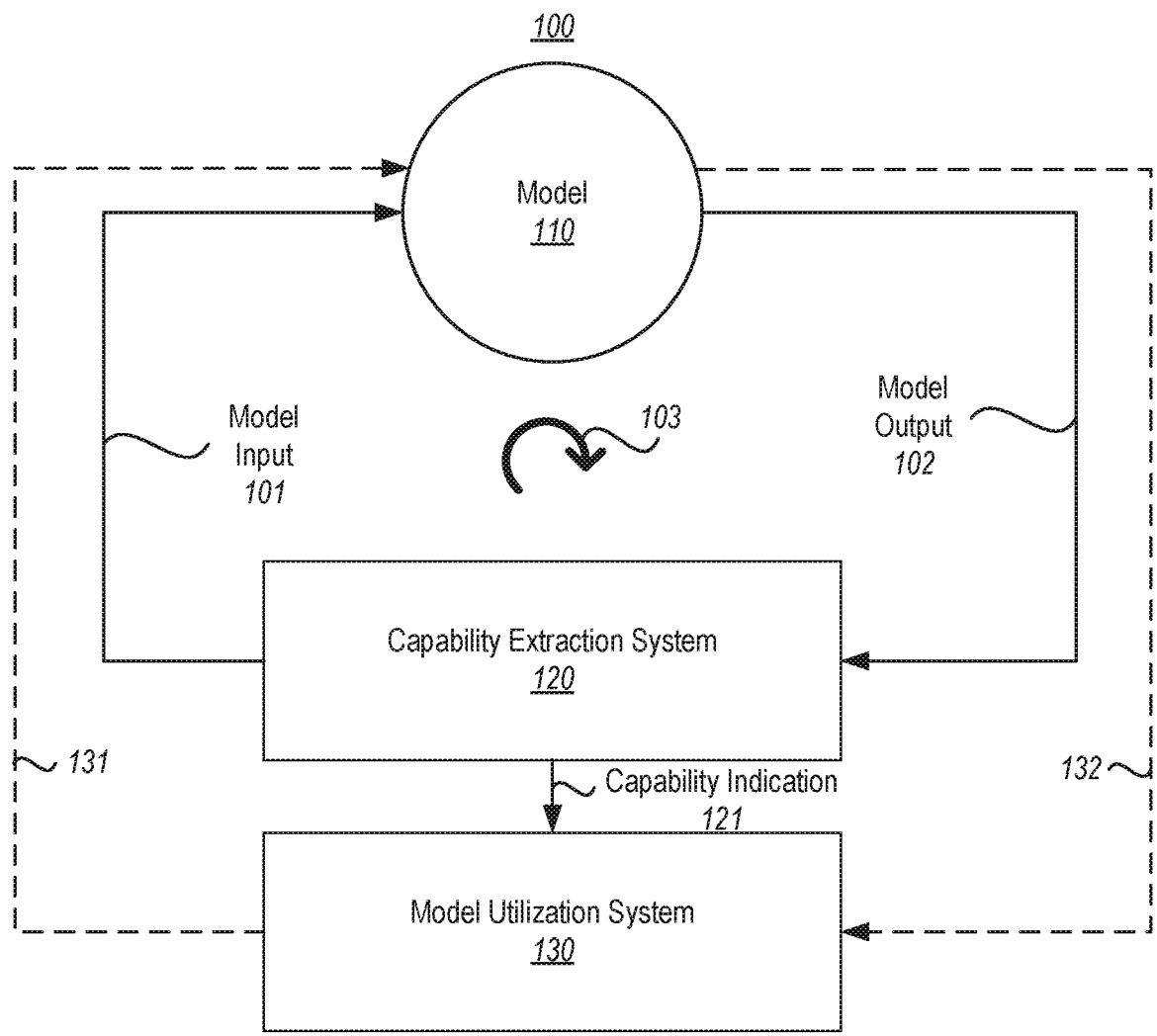
FIG. 1 illustrates a system in which the principles described herein may be practiced, which includes a capability extraction system that interacts with a model to estimate or determine one or more capabilities of the model, and a model utilization system which uses the one or more capabilities to better utilize the model, in accordance with the principles described herein.

FIG. 1 illustrates a system 100 in which the principles described herein may be practiced. The system 100 includes a model 110, which is symbolically represented as a circle. As an example, the model 110 may be a neural network model that has billions of parameters or more. In this description and in the claims, a "large model" is a model that has at least one billion parameters that were adjustable during training of the model. Examples of large models include GPT-3®, AlphaCode, PaLM, DALL•E 2, and so forth. In this description and in the claims, a "large language model" is a large model that was trained on textual training data, such as natural language text or code.

However, the principles described herein apply regardless of the model, and may be used even for models that have not yet been introduced or constructed. After all, large models will have larger and larger numbers of adjustable parameters as time progresses, and thus the capabilities of the large model will become more and more sophisticated. It is particularly difficult to know what a large model understands, and what capabilities it possesses. By using the principles described herein, models may be more fully utilized to their potential by providing a systematic way to discover capabilities possessed by the model.

The system 100 also includes a capability extraction system 120, which interacts with the model 110 to determine at least some of the capabilities that the model 110 possesses. The capability extraction system 120 may be, for example, a computing system, such as the computing system 600 described below with respect to FIG. 6. Alternatively, or in addition, the capability extraction system 120 may be one or more executable components (such as the executable component 606 of the computing system 600) that operates on a computing system. The capability extraction system 120 interacts with the model 110 by providing language model input 101 to the model 110, receiving resulting output 102 from the model 110, and then evaluating that output 102.

This interaction with the model 110 may involve several of such interactions as represented by the circular arrow 103. Each of these interactions may be referred to herein as a capability extraction stage or ("capability extraction stage 103"). Each capability extraction stage 103 thus includes both providing the model input to the model (as represented by arrow 101) and the receiving of the resulting output (as represented by the arrow 102). That said, the failure of the model to provide model output may also be regarded as an event that may be evaluated as part of the capability extraction stage 103 (in which case there is no resulting output represented by arrow 102). As an example, the capability extraction system 120 may use the evaluation of the output from a prior interaction with the model 110 to form another model input for the next interaction.

The principles described herein are not limited to the capability or capabilities that are going to be estimated or determined as possessed by (and not possessed by) the model. As examples only, the estimated or determined capability could be an ability to semantically determine a type of a string provided in the model input, a support of the model for abbreviations, an ability to determine how components of data within the model input are related, a recognition of an importance of data within the model input, an awareness of a property of data within the model input, or any other capability.

Whether only one capability extraction stage or a sequence of capability extraction stages is performed to estimate or determine what capabilities the model 110 possesses, the capability extraction system 120 outputs a capability indication 121 indicating an estimation or determination of whether or not the model 110 possesses one or more capabilities. For example, if the model knows that a string "1/2" represents a date of Jan. 2, 2022" in one context, Feb. 1, 2022 in another context and the fraction one half in yet another context, the model may then be estimated or determined to be able to use context to disambiguate between fractions and dates, and between conflicting date formats. Thus, the capability indication might identify a new capability that was never realized as being possessed by the model.

The capability indication 121 is output to a model utilization system 130 which then uses the discovered capability of the model 110. Specifically, the model utilization system 130 can use the discovered capability of the model 110 and form an appropriate model input 131, and obtain helpful model output 132. Alternatively, rather than engage in a separate interaction with the model 110, the model utilization system 130 may directly use the output from one of the interaction stages performed by the capability extraction system. Thus, through systematic discovery of the capabilities of the model 110, the language model 110 may be more fully utilized to its potential. The model utilization system 130 may be, for example, a computing system, such as the computing system 600 described below with respect to FIG. 6. Alternatively, or in addition, the model utilization system 130 may be one or more executable components (such as the executable component 606 of the computing system 600) that operates on a computing system. Now, more regarding the process for discovering the capabilities of the model will be described with respect to FIGS. 2 through 5.

Figure 2:
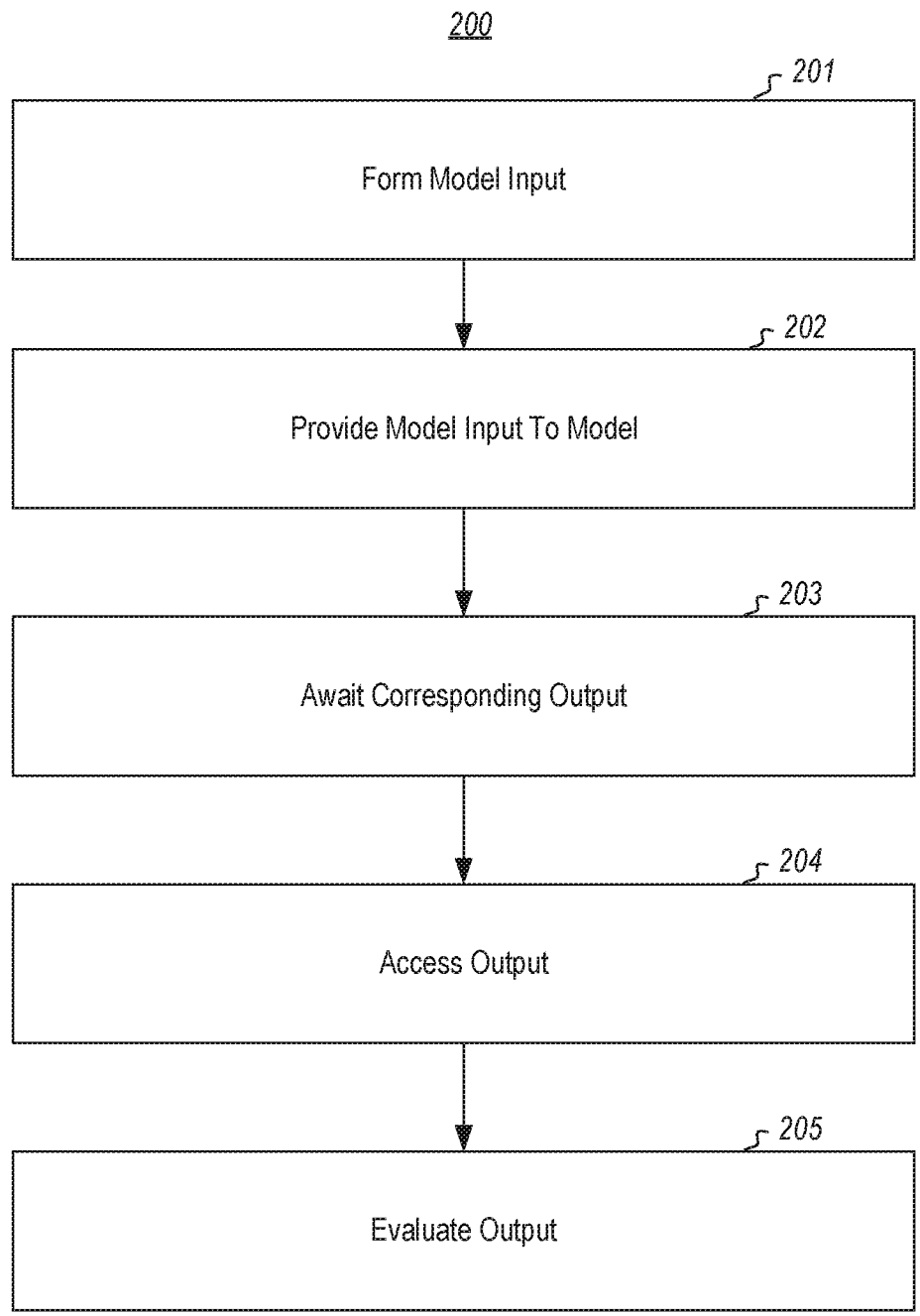
FIG. 2 illustrates a flowchart of a method for performing a capability extraction stage, in accordance with the principles described herein.

More specifically, FIG. 2 illustrates a flowchart of a method 200 for performing a capability extraction stage, in accordance with the principles described herein. The method 200 may be performed by the capability extraction system 120 of FIG. 1, in order to perform a capability extraction stage 103 with the model 110. The method 200 includes formulating a model input (act 201), and feeding the model input to the model (act 202) (which is represented by arrow 101 in FIG. 1). The capability extraction system 120 then awaits the resulting output from the model (act 203). Then, method 200 also includes the capability extraction system accessing the output that results from the model input being provided to the model (act 204) (which is represented by arrow 102 in FIG. 1). The capability extraction system then evaluates that output (act 205). Alternatively, if there is no model output resulting from the model 110 receiving the model input, that absence of model output may also be evaluated (act 205).

Figure 3:
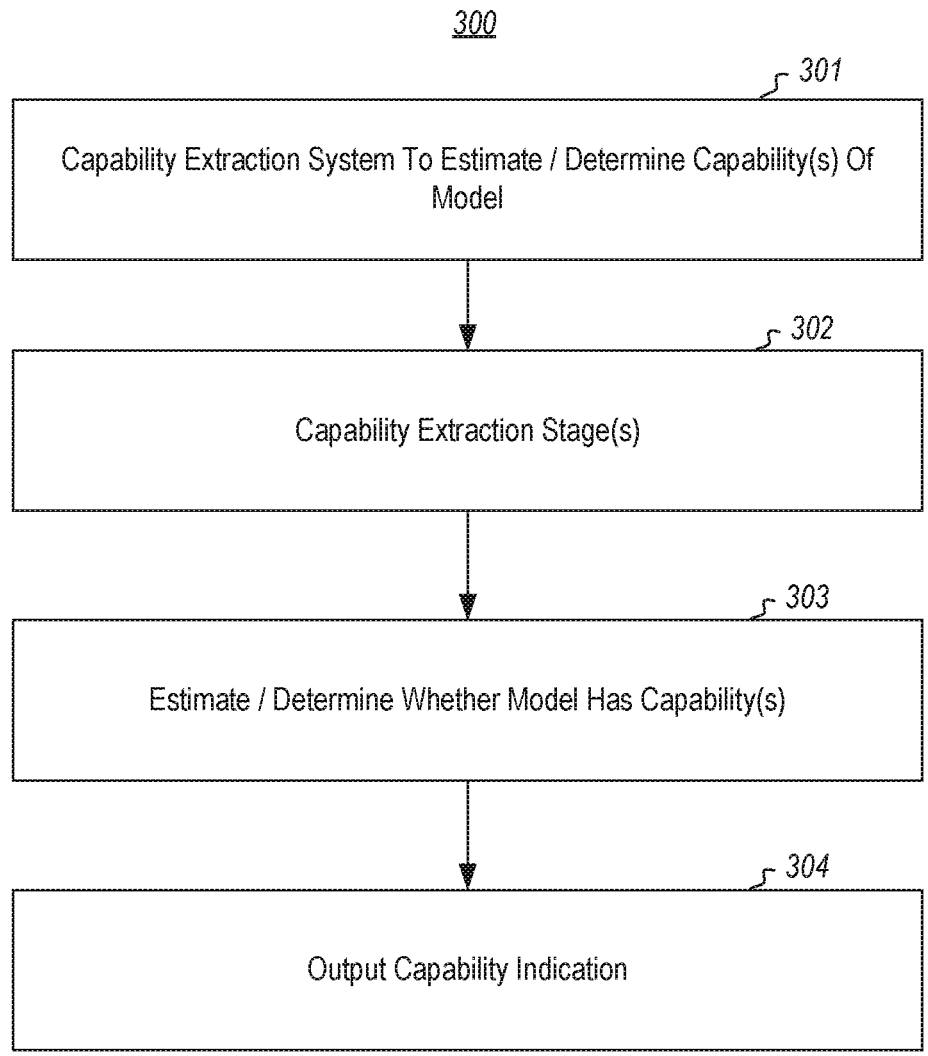
FIG. 3 illustrates a flowchart of a method for estimating or determining whether or not the model possesses one or more capabilities, using one or more capability extraction stages, in accordance with the principles described herein.

FIG. 3 illustrates a flowchart of a method 300 for estimating or determining whether or not the model possesses one or more capabilities, in accordance with the principles described herein. The method 300 may be performed by the capability extraction system 120 of FIG. 1, in order to output the capability indication 121 of FIG. 1. The method 300 includes determining that the capability extraction system is to estimate or determine whether the model has the one or more capabilities (act 301). Then, the capability extraction system performs one or more capability extraction stages (act 302) to determine whether the model has the capability or capabilities (act 303). As an example, act 302 may involve performing the method 200 one or more times.

The method 300 then includes outputting a capability indication (act 304) that indicates whether or not the model 110 possesses the one or more capabilities. As seen in FIG. 2, the capability extraction system 120 outputs the capability indication 121 that represents whether or not the model has the one or more capabilities.

Figure 4:
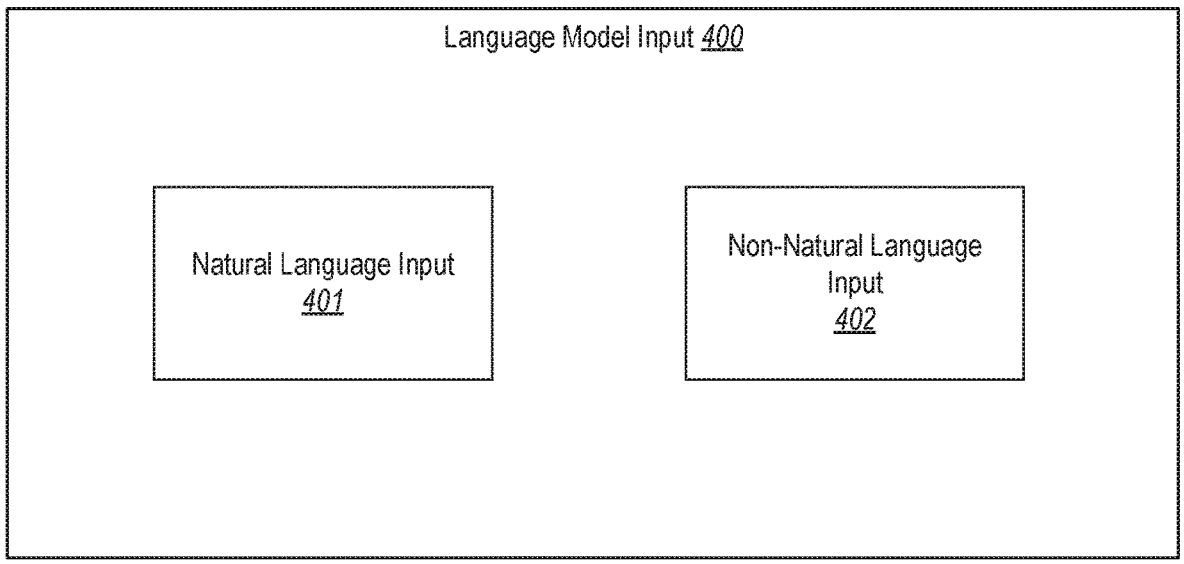
FIG. 4 illustrates a structure of a language model input that has natural language input as well as potentially non-natural language input.

The model may be a language model. FIG. 4 illustrates a structure of a language model input 400, which is an example of the model input 101 when the model 110 is a language model. The language model input 400 has natural language input 401 as well as potentially non-natural language input 402. That non-natural language input 402 may be for example data that is to be processed by the language model along with the natural language input 401. As an example, the language model input 400 might be a collection of strings and numbers (which is the non-natural language input), and the natural language input may be a natural language question or command (such as perhaps "which in this list is a Japanese carmaker?").

In a direct capability extraction stage, the output generated by the language model is or should be a natural language response that semantically responds to the natural language input 401 of the language model input 400. As an example, the natural language input might be "Are you able to tell me which in a list of carmakers is a Japanese carmaker", and the response might be or should be something like "Yes" or "Yes, I can recognize Japanese carmakers". This allows for a direct determination using the semantics of the natural language response itself to be able to determine that the language model has the capability to recognize Japanese carmakers.

As an alternative example, the natural language input might be "What are the Japanese carmakers", and the language model may generate a natural language response "The Japanese carmakers are . . . ," and then list several Japanese carmakers. That would be semantically responsive in natural language to the natural language input, and thus this exchange would also be a "direct" capability extraction stage.

In yet another example, the natural language input might be "Is the string '16' a date string?", and the reply might be "Yes". Regardless of whether the answer was correct, the natural language response is indeed semantically responsive to the natural language input, and thus the exchange is indeed a "direct" capability extraction stage. After all, some information about the capabilities of the language model may be inferred from a correct natural language response as well as from an incorrect natural language response. Also, if no model output is received at all, that absence of model output may also be used to infer information about the capabilities of the language model.

On the other hand, in an "indirect" capability extraction stage, the output generated by the language model is either not natural language at all, or else is natural language that is not semantically responsive to the natural language input 401 in the language model input 400. As an example, the natural language input might be a request to generate code, and the response could be the generation of the code. Code is not natural language. Thus, this is an indirect capability extraction stage. As another example, the natural language input might be a request to perform a task, and the output is data that is not structured in natural language form. For instance, the natural language input might be "show me a lion in its natural habitat" and the output is an image of a lion in a savanna. From this, it may be inferred that the model knows that the natural habitat of a lion is the savanna. Such as also an indirect capability extraction stage since the model output is not in natural language form. As yet another example, the output might be a reference to external data. A reference to external data is not a natural language form, and thus this also is an indirect capability extraction stage.

As a final example, the output might be a natural language output that represents a semantic completion of the natural language input. As an example, "Who" is natural language and may be provided to the model input. The model output might be a completion of the question "are the Japanese carmakers?" That is natural language output, but that output is not semantically responsive to the natural language input. That is "are the Japanese carmakers" is not a response to the question "Who". Thus, this is also an example of an indirect capability extraction stage. Thus, the use of a language model to autocomplete natural language is not an example of a direct capability extraction stage, but is an example of an indirect capability extraction stage. Similarly, for models that are not language models, providing a picture of a lion with a blank background and asking a model to fill in the background to determine what the natural habitat of a lion is an example of an indirect capability extraction stage.

Like direct capability extraction stages, reasonable model output may be used to determine capabilities of the language model, but also unreasonable model output may also be used to determine capabilities of the language model. Furthermore, if no model output is generated in response to model input, the absence of a model answer may also be used to infer information about the capabilities of the language model.

As mentioned above, the model input 400 includes natural language input 401 as well as potentially non-natural language input 402. Such non-natural language input 402 may be data that the capability extraction system itself provides to the language model. While the model input is not required to have non-natural language input 402, the presence of non-natural language input 402 can aid greatly in accelerating the discovery of capabilities of the language model.

Several examples of model input and resulting model output will now be provided. Each of these examples represents actual interactions with an existing language model.

Example 1A

For example, consider the following model input (in the examples that follow, lines that represent model input will be labelled on the left with capitalized letters, such as A, B, and so on, but such labels are not actually part of the model input and are just used herein for convenience and easy reference):

A. #Make a List of Japanese Car Makers

The model output might be as follows: (in the examples that follow, lines that represent model output will be labelled on the left with numbers, such as 1, 2, and so on, but such labels are not actually part of the model output and are just used herein for convenience and easy reference):

1. #1. Import the Csv Module

The model input included natural language input that asked the language model to perform a task "make a list of japanese car makers". But the model output is not a list of Japanese carmakers. Instead, it is just a comment to import a csv module. Here, line A of the model input is natural language input. However, there was no non-natural language input provided to the language model. Here, the language model was not capable of completing the task without additional non-natural language input. In other words, the language model could not perform the task based on its own inherent understanding (also called "world data"). This "world data" understood by the language model is derived from the training that the language model experienced.

Now let us take the same example but add non-natural language input.

Example 1B

Suppose that the model input is as follows:

A. auto_companies=['Tesla', 'Ford', 'GM', 'Toyota', 'Honda', 'Nissan', 'BMW', 'Noltswagen', 'Daimler', . . . ]
B. #Make a List of Japanese Car Makers Here, line B is the same natural language input requesting that the language model perform a task. However, line A is non-natural language input.

Here, the language model may generate the following model output 1. japanese_car_makers=['Toyota', 'Honda', 'Nissan', 'Mazda', 'Mitsubishi', 'Subaru', 'Suzuki', . . . ]

Here, the language model did successfully complete the task, from which it can be inferred that the language model can recognize Japanese carmakers from non-Japanese carmakers from a list of carmakers. Thus, from this, the inventors have observed that language models may be capable of performing tasks if provided non-natural language input (such as user data) that they would not otherwise be able to do based on world data alone. Furthermore, when the language model provides a correct response to model input, an estimation or determination of what the capabilities of the language model are may be more quickly obtained with fewer capability extraction stages.

Accordingly, in one embodiment, a subsequent capability extraction stage may build upon the evaluation of a prior capability extraction stage changing or augmenting the non-natural language input as compared to what was provided in the prior capability extraction stage. Alternatively, or in addition, the natural language input in a subsequent capability extraction stage may be different than the natural language input in a prior capability extraction stage. Either way, a result of the evaluation of the prior capability extraction stage may be used in formulating the model input for the subsequent capability extraction stage.

Another observation that the inventors have made through experimentation is that indirect capability extraction stages can often be more effective than direct capabilities extraction stages in identifying the capabilities of a language model.

Example 2A

For instance, consider the following model input.

A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['Boulder, CO', 'Las Vegas, NV', 'Seattle, WA']
G. #which column contains names Here, lines A through F of the model input are non-natural language input in the form of code. Line G is natural language input, and an acceptable response would be natural language output that is semantically responsive to the natural language input. Thus, this is model input of a direct capability extraction stage.

However, the model output is as follows:

1. df.columns

This is not an acceptable response to the natural language question "which column contains names".

Example 2B

Now let us take the same example, and design the natural language input so as to request a task be performed. For instance, consider the following model input.

A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['Boulder, CO', 'Las Vegas, NV', 'Seattle, WA']
G. #create a column with the initials The non-natural language input in lines A through F of the model input are identical as the prior example. However, now the natural language input of line G is structured to ask that a task be performed. Specifically, natural language input that is structured to result in a semantically responsive natural language output is often not as effective as natural language input that is structured to result in a new column with initials. Here, an acceptable response is not natural language at all, but a new column with the initials. Here, the model output is as follows:

1. df['Initials']=df['A'].str.split( ).str(0).

From this task completion, it can be estimated or determined that the language model has the capability to recognize that column A contains names of people, that the language model knows what initials are, and how to create initials from names. Thus, the capabilities were more quickly estimated or determined (at least in this example) from performing an indirect capability extraction stage as compared to a direct capability extraction stage.

Example 3

Here is a similar example of the model input.
A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['20200415', '20201521', '20190304']
F. df['E']=['Boulder, CO', 'Las Vegas, NV', 'Seattle, WA']
G. #create a column that includes the year The non-natural language input of lines A through F is similar to that of the prior example, except there is a column D inserted that includes strings that we as humans can likely recognize as being dates. Now suppose that the model output is as follows.
 1. df['Year']=df['D'].str[:4]
 2. df['Year']=df['Year'].astype(int)

The model output takes the form of a task completion. From the task completion, the capability extraction system may estimate or determine that the language model understands that the strings that take the form in column D are indeed date strings, that the language model understands what a year is, and that the first four characters in the date string represent the year.

Example 4

The following is another example of model input.
A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['Boulder, CO', ' ', 'Seattle, WA']
G. #Calculate who has an empty string for their location The following is the model output.
 1. df['isempty']=df['D'].isnull( )

From this task completion, the capability extraction system may estimate or determine that language model recognizes the content of column D as containing locations, and furthermore, that the location for Bob Jones is missing. Thus, the capability extraction system may estimate or determine that the language model is capable of determining when a column contains location, and that the language model knows when an element of a list is missing.

Example 5

As another example, assume the following model input.
A. import pandas as pd
B. df=pd.DataFrame( )
C. df['A']=['milk', 'flour', 'salt', 'yeast', 'cream', 'honey']
D. #make a list of the dry ingredients The natural language input of line D is asking the language model to perform a task in the form of categorizing the non-natural language input of line C. Suppose that the model output is as follows.
 1. dry=['flour', 'salt', 'yeast']

From this response, the capability extraction system may estimate or determine that the language model can recognize ingredients and can distinguish wet and dry ingredients from a list.

Example 6

Here is another example of model input in which a table is defined in which there is a column A that has five states of the United States listed.
A. import pandas as pd
B. df=pd.DataFrame( )
C. df['A']=['Florida', 'Georgia', 'Minnesota', 'Texas', 'California]
D. #create a column with the 2-letter state abbreviation.

The model output might then be as follows.
 1. df['State Abbreviation']=['FL', 'GA', 'MN', 'TX', 'CA']

From this response, the capability extraction system may estimate or determine that the language model can recognize states from a list of states, and also knows the proper abbreviations of those states.

Example 7

Here is another example of model input which defines the same table as the prior example, but in which the language model is asked about which region each state is located in.
A. import pandas as pd
B. df=pd.DataFrame( )
C. df['A']=['Florida', 'Georgia', 'Minnesota', 'Texas', 'California]
D. #create a column with the US region The model output might then be as follows.
 1. df['Region']=['South, 'South', 'Midwest', 'South', 'West']

From this response, the capability extraction system may estimate or determine that the language model can recognize states from a list of states, and also understands United States regions, and can properly categorize states into their respective region.

Example 8

Here is another example of model input that defines non-natural language input in the form of a table having columns A through F.
A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['20200415', '20201521', '20190304']
F. df['E']=['Boulder, CO', 'Las Vegas, NV', 'Seattle, WA']
G. #map the cities to zip codes using a dictionary The natural language input of line G asks the language model to map the cities to zip codes. Now suppose that the model output is as follows.
 1. df['zip']=df['E'].map({'Boulder, CO': '80301', 'Las Vegas, NV': '89101', 'Seattle, WA': '98101'})

Here capability extraction system may determine that the language model can identify the zip codes for cities.

Example 9

Here is an example in which the language model can infer what a user's intent may be based on defects in the data and based on the beginnings of a question. The model input may be as follows:

A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['Boulder, CO', ' ', 'Seattle, WA']
G. #Who . . . .

Here, the model output may take the form of an autosuggestion of a completion of the natural language input that begins with "Who". For instance, the model output may be of the form of "has a blank location". Thus, the screen may then appear as follows where the italicized portion in line G represents the automatic suggestion:

A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['Boulder, CO', ' ', 'Seattle, WA']
G. #Who has a blank location?

From the very fact that the language model made this suggestion, the capability extraction system may estimate or determine that the language model has the capability of identifying what types of data defects are of concern, can identify a missing data defect, that column D contains a list of locations one of which being missing, and that these locations each correspond to a person, and that column A contains a list of people.

Example 10

Here is another example in which the language model can infer what a user's intent may be based on the nature of the data represented as non-natural language input.

A. import pandas as pd
B. df=pd.DataFrame( )
C. df['items']=['apple', 'banana', 'cherry', 'grape']
D. df['Units']=[4, '2⅔', '½', '⅙']
E. df['Price']=[0.35, 0.2, 0.1, 0.15]
F. #convert units to . . . .

Here, the model output may take the form of an autosuggestion of a completion of the natural language input that begins with "convert units to". For instance, the model output may be of the form of "numeric". Thus, the screen may then appear as follows where the italicized portion in line G represents the automatic suggestion:

A. import pandas as pd
B. df=pd.DataFrame( )
C. df['Items']=['apple', 'banana', 'cherry', 'grape']
D. df['Units']=[4, '2⅔', '½', '⅙']
E. df['Price']=[0.35, 0.2, 0.1, 0.15]
F. #convert units to numeric From the very fact that the language model made this suggestion, the capability extraction system may estimate or determine that the language model can recognize when a string in a list of strings is a fraction (versus for example a date). This could be quite helpful for instance in a spreadsheet program to respond appropriately when a user enters for example "1/2" to know that, in the context of the remainder of the spreadsheet, whether the user is entering a fraction or a date. This feature could also be beneficial for any compilation process where type conversion is performed. Thus, a compiler could use the language model in the compilation process if the language model knows particular type conversions in particular contexts.

Example 11

Here is another example in which the capabilities of the language model may be estimated when output is an external reference.

A. import pandas as pd
B. df=pd.DataFrame( )
C. df['A']=['Alice Smith', 'Bob Jones', 'Casey Williams']
D. df['B']=[1430, 760, 1100]
E. df['C']=['tennis, hiking', 'reading, scuba', 'birding, fencing']
F. df['D']=['20200415', '20201521', '20190304']
F. df['E']=['Boulder, CO', 'Las Vegas, NV', 'Seattle, WA']
G. #get a dataset with population data for each city Here, the model input asks the language module to perform a task of getting a dataset that maps population data and cities. The model output may take the following form.
1 url='http://" and so forth Depending on whether the provided url in the model output truly does map population data to cities, the capability extraction system may determine that the language model knows where to find population data mapped to cities, and that column E represents cities. Evaluation of the url may involve the capability extraction system actually trying to use the url to navigate. If navigation fails, or if the dataset does not include the correct mapping, then the capability extraction system may use this failure to estimate or determine a capability of the language model.

Figure 5:
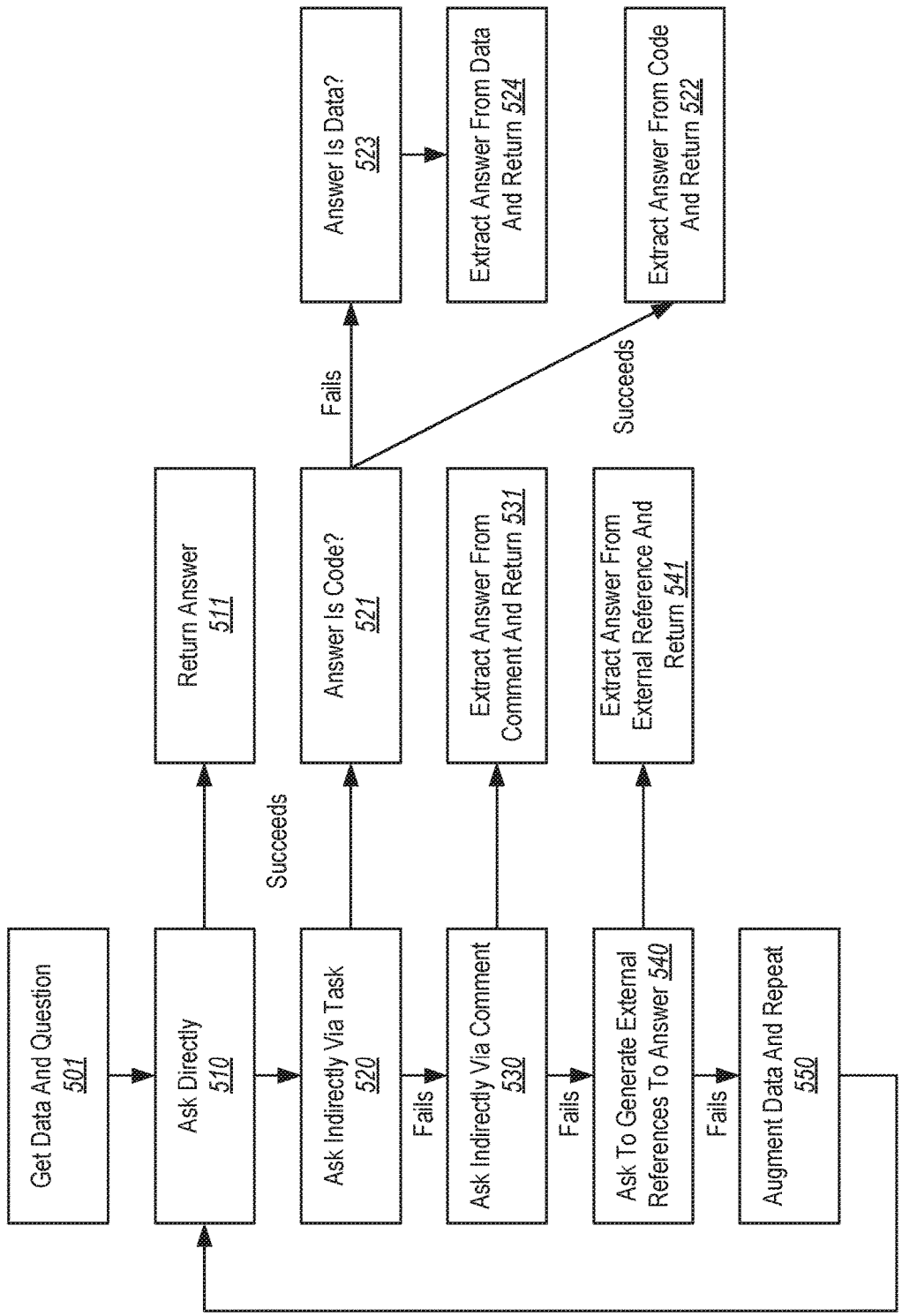
FIG. 5 illustrates a flowchart of an example method for estimating or determining one or more capabilities of a language model using one or more capability extraction stages, in accordance with one embodiment of the method of FIG. 3.

As previously mentioned with respect to FIG. 3, the capability extraction system performs one or more capability extraction stages in act 302. FIG. 5 illustrates one example of the performance of act 302 in which the multiple capability extraction stages may be performed. The method 500 is a systematic method to estimate or determine the capabilities of a language model.

Here, the method 500 begins by acquiring data and a question (act 501). Here, the question is what capability the language model is to be estimated or determined to have, and takes the form of natural language input, such as natural language input 401 of FIG. 4. The data may be user data and is not in the form of natural language input, and which may be the non-natural language input 402 of FIG. 4.

Returning to the method 500, in this particular embodiment, the capability extraction system performs a direct capability extraction stage (act 510). As part of the direct capability extraction stage (act 510), a natural language answer is accessed (act 511). If the direct capability extraction stage is successful, then the answer contains a direct natural language statement about the capability of the language model. If no answer is received, or the answer does not take a natural language form, or is otherwise not a valid answer, then the direct capability extraction stage fails.

If the direct capability extraction stage fails, the capability extraction system tries an indirect capability extraction stage (act 520) asking the language model to perform a task. Then, processing branches depending on whether the task performed results in code or data (act 521). If the answer is code, the code is evaluated by performing static analysis of the code, or by running the code. If this succeeds, the capability is determined from the code (act 522). On the other hand, if the capability cannot be determined from the code, or the code is not executable, the answer may be data (act 523) in which case the capability may be perhaps identified from static analysis of the data (act 524).

However, if the capability of the language model cannot be determined from this first indirect capability extraction stage (act 520), then the capability extraction system attempts another indirect capability extraction stage (act 530). In this second indirect capability extraction stage, the natural language input is a comment that aims at getting an automatic suggested completion from the language model. That automatic suggestion may be used to determine the capability of the language model (act 531).

However, if the capability of the language model cannot be determined from this second indirect capability extraction stage, then a third indirect capability extraction stage is attempted (act 540). Here, the capability extraction system asks for an external reference. The answer then takes the form of an external reference, which may be evaluated to determine if the language model has the capability (act 541).

If after this third indirect capability extraction stage (act 540), the capability extraction system still has no estimate or determination as to whether the language model has the capability, the capability extraction system augments the non-natural language input (act 550) and repeats the various capability extraction stages 510, 520, 530 and 540 with the augmented user data.

Returning to FIG. 1, after the capability extraction system 120 indicates the capability of the language model 110 via the capability indictor 121, a model utilization system 130 may then utilize the capability of the language model 110. In one example, the first natural language input of the first capability extraction stage is a natural language query entered by a user. Suppose then that this natural language query may be executed by the language model only if it is known that the language model already has a capability. In this case, after the capability extraction system 120 determines that the language model 110 has the capability, the query is then submitted (as represented by the arrow 131) to the language model 110.

However, the model utilization system 130 might have no interaction with a user. For instance, the model utilization system 130 might be part of a compiler or other component that is to determine what the type of a string is. The model utilization system 130 could use the language model 110 to determine the type of a string if the capability extraction system 120 determines that the language model can distinguish the type of a string in similar contexts. Thus, once the capability extraction system 120 indicates that the language model has the capability, the model utilization system may ask the language model to determine the type of a string.

Accordingly, the principles described herein allow a systematic way to discover capabilities of models, thereby allowing for richer use of such models. Because the principles described herein are performed in the context of a computing system, some introductory discussion of a computing system will be described with respect to FIG. 6. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
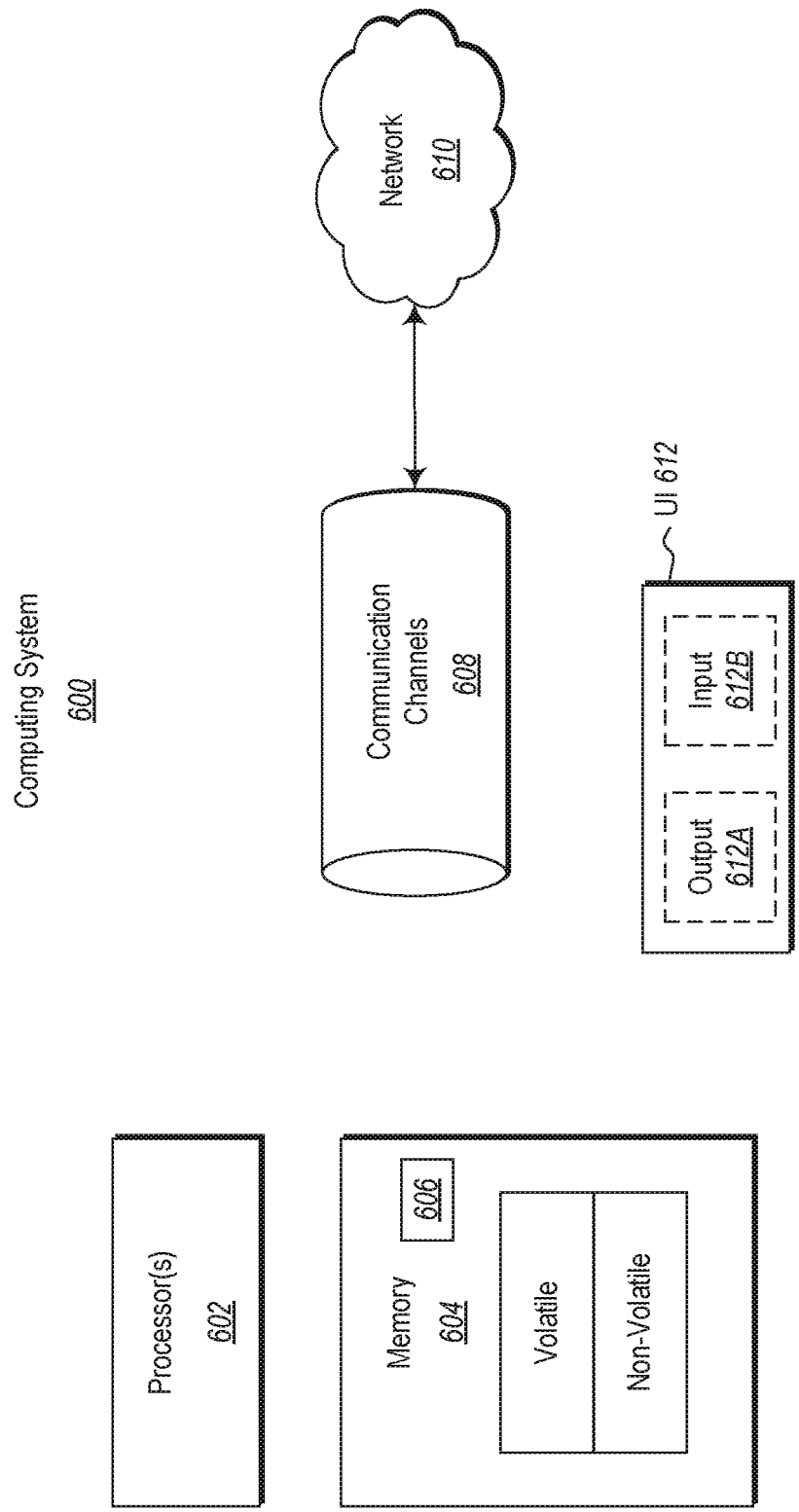
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that determines a capability of a language model without directly querying the language model to ask what capabilities the language model has, said computing system comprising:
    a capability extraction system that interacts with the language model to determine the capability of the language model, wherein the capability extraction system interacts with the language model by (i) providing language model input to the language model, (ii) receiving resulting output from the language model, and (iii) evaluating the output to identify the capability of the language model;
    a model utilization system that receives a capability indication from the capability extraction system, where the capability indication indicates the capability of the language model, and that utilizes the capability of the language model by tasking the language model to assist in performing an operation;
    one or more processors; and
    one or more hardware storage devices that store instructions that are executable by the one or more processors to cause the computing system to:
        causing the capability extraction system to formulate the language model input, wherein the capability extraction system structures the language model input to include natural language input;
        causing the capability extraction system to feed the language model input to the language model;
        causing the capability extraction system to access the output from the language model, where the output results from the language model input being provided to the language model, the output being in a form of a non-natural language output or a natural language output that is semantically non-responsive to the natural language input;
        causing the capability extraction system to output a capability indication indicating an estimation or determination of the capability of the language model, wherein the capability indication is generated based on the output from the language model;
        causing the capability extraction system to provide the capability indication and the output from the language model to the model utilization system;
        as a part of a first operation of the model utilization system, causing the model utilization system to use the output, which is an earlier generated output, to perform the first operation, such that the model utilization system does not engage with the language model during the first operation; and
        as a part of a second operation of the model utilization system, causing the model utilization system to utilize the capability of the language model by tasking the language model to assist in performing the second operation, such that the model utilization system does engage with the language model during the second operation,
    wherein the language model is a large language model.

2. The computing system in accordance with claim 1, wherein the natural language input includes a natural language request to perform a task, and wherein the output includes a result of the language model performing the task.

3. The computing system in accordance with claim 1, wherein the output is code.

4. The computing system in accordance with claim 1, wherein the output is a generated image.

5. The computing system in accordance with claim 1, the capability being a capability to semantically determine a type of a string provided in the language model input.

6. The computing system in accordance with claim 1, the capability comprising a support of the language model for abbreviations.

7. The computing system in accordance with claim 1, the capability comprising a capability to determine how components of data within the language model input are related.

8. The computing system in accordance with claim 1, the capability comprising a recognition of an importance of data within the language model input.

9. The computing system in accordance with claim 1, the capability comprising an awareness of a property of data within the language model input.

10. The computing system in accordance with claim 1, wherein the capability is used by a compiler to perform compilation.

11. The computing system in accordance with claim 1, wherein the capability is used to automatically make a suggestion about data to a user.

12. A method for determining a capability of a language model without directly querying the language model to ask what capabilities the language model has, said method comprising:
    accessing a capability extraction system that interacts with the language model to determine the capability of the language model, wherein the capability extraction system interacts with the language model by (i) providing language model input to the language model, (ii) receiving resulting output from the language model, and (iii) evaluating the output to identify the capability of the language model;
    accessing a model utilization system that receives a capability indication from the capability extraction system, where the capability indication indicates the capability of the language model, and that utilizes the capability of the language model by tasking the language model to assist in performing an operation;
    causing the capability extraction system to formulate the language model input, wherein the capability extraction system structures the language model input to include natural language input;
    causing the capability extraction system to feed the language model input to the language model;

causing the capability extraction system to access the output from the language model, where the output results from the language model input being provided to the language model, the output being in a form of a non-natural language output or a natural language output that is semantically non-responsive to the natural language input;

causing the capability extraction system to output a capability indication indicating an estimation or determination of the capability of the language model, wherein the capability indication is generated based on the output from the language model;

causing the capability extraction system to provide the capability indication and the output from the language model to the model utilization system;

as a part of a first operation of the model utilization system, causing the model utilization system to use the output, which is an earlier generated output, to perform the first operation, such that the model utilization system does not engage with the language model during the first operation; and as a part of a second operation of the model utilization system, causing the model utilization system to utilize the capability of the language model by tasking the language model to assist in performing the second operation, such that the model utilization system does engage with the language model during the second operation, wherein the language model is a large language model.

* * * * *